Patented Aug. 29, 1933

1,924,574

UNITED STATES PATENT OFFICE 1,924,574

VULCANIZATION OF RUBBER

Winfield Scott, Nitro, W. Va., assignor to The Rubber Service Laboratories Co., Akron, Ohio, a corporation of Ohio No Drawing. Application April 15, 1930
Serial No. 444,607

10 Claims. (Cl. 18—53)

The present invention relates to a process of manufacturing vulcanized rubber of high quality and it has, for its primary object, the provision of accelerators of characteristic curing powers, which may be employed in the production of such rubber.

Mercapto-benzo-thiazole having the formula

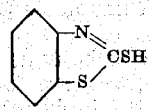

and which is one of the many reaction products obtained by heating a mixture of thiocarbanilid and sulfur, has been described as a rubber vulcanization accelerator of some value, but I have now found that its usefulness can be greatly increased by reacting it with certain other compounds which are hereinafter fully described and using the materials so obtained as accelerators.

Mercapto compounds are somewhat acidic in nature, due to the presence of the —SH group contained therein, and will therefore form salts with various metals, and will also react with the more stable and less volatile of the organic bases to form compounds which may be termed salts, and which themselves possess particularly high value as accelerators of the rubber vulcanization process as is hereinafter set forth. Certain of the metallic salts of mercapto compounds have already been described as vulcanization accelerators, but my invention is concerned with the use of the more powerful accelerating materials hereinafter described in detail. A mercaptan or a derivative of a mercaptan, to display its accelerating properties to the greatest degree, preferably should have within the molecule, some group or grouping which will tend more or less completely to counteract the acidic nature of the —SH group by furnishing more highly ionizable compounds which are of a less acidic nature.

It has been found that various types of organic materials may be employed to decrease the acidic nature of mercapto compounds. Thus, for example, one important class of compounds which has been employed to react with the mercaptans to produce substances having vulcanization accelerating properties is that comprising piperidine and its derivatives, that is, heterocyclic compounds containing at least one nitrogen atom in the ring.

As one example of the preferred process, piperidine and mercapto-benzo-thiazole substantially in equi-molecular proportions were mixed in a solvent, for example alcohol, and caused to react preferably at room temperature. On evaporation of the solvent, a pasty mass, non-voltaile at room temperature was obtained.

The reaction product obtained as described may be compounded in the well known manner in the proportion of 0.5 parts of accelerator with 100 parts of rubber (for example pale crepe), 5 parts of zinc oxide and 2 parts of sulfur and the mixture vulcanized in a press at the temperature given by steam under 20 pounds of pressure per square inch. The following table shows the results of the tests obtained by testing sheets of rubber vulcanized under the conditions described for different periods of time at the temperature obtained from 20 pounds of steam pressure per square inch.

| Time of cure, minutes | Pressure, lbs. steam | Modulus of elasticity in lbs./in.² at elongations of | | | Tensile at break in lbs./in.² | Elongation at break |
|---|---|---|---|---|---|---|
| | | 300% | 500% | 700% | | |
| 30 | 20 | 202 | 446 | 1883 | 3403 | 825% |
| 45 | 20 | 224 | 529 | 2103 | 3595 | 815% |
| 60 | 20 | 225 | 526 | 2243 | 3680 | 815% |

As another example of the preferred process, mercapto-benzoxazole

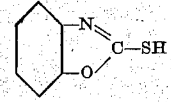

and piperidine were mixed in the presence of a solvent, preferably alcohol and allowed to stand approximately two days. After evaporating to dryness, a residue comprising one of my preferred type of accelerators remained. The reaction product obtained as described may be compounded in the well known manner in the proportion of 0.5 parts of accelerator with 100 parts of rubber (for example pale crepe rubber) 5 parts of zinc oxide and 3.5 parts of sulfur and the mixture vulcanized in a press at the temperature given by steam under 20 and 40 pounds pressure per square inch. The following table gives the results of the tests obtained by testing sheets of rubber vulcanized under the conditions described for different periods of time at the temperature obtained from 20 and 40 pounds steam pressure per square inch.

| Time of cure, minutes | Pressure, lbs. steam | Modulus of elasticity in lbs./in.² at elongations of | | | Tensile at break in lbs./in.² | Elongation at break |
|---|---|---|---|---|---|---|
| | | 300% | 500% | 700% | | |
| 45 | 20 | 97 | 181 | 500 | 2090 | 980 |
| 15 | 40 | 89 | 162 | 396 | 1715 | 990 |
| 30 | 40 | 133 | 243 | 717 | 2243 | 895 |
| 45 | 40 | 148 | 283 | 837 | 2485 | 905 |

Another example of my preferred type of accelerators is the product formed by reacting piperazine having the formula

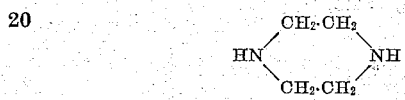

and its derivatives with a mercaptan. For example, substantially one molecular proportion of piperazine is treated with substantially one molecular proportion of mercapto-benzoxazole

in the presence of a solvent, for example, alcohol. After heating on a water bath for substantially one hour, the solvent was evaporated. A white solid residue remained. Samples of this material have been incorporated in a rubber mix similar to that set forth in the first example hereinbefore given for the manufacture of a vulcanized rubber product.

Piperazine and its derivatives may be reacted with other mercapto derivatives to form the preferred type of compounds. For example, piperazine hydrochloride and sodium benzyl mercaptide are mixed preferably in an aqueous alcoholic solution. Reaction takes place. The solution was evaporated to dryness. The residue was then treated with a solvent, for example alcohol, in which the sodium chloride formed was insoluble. The sodium chloride was filtered off and the filtrate evaporated to dryness. The residue comprised one of my preferred type of compounds.

A further example of the preferred type of accelerators is formed by reacting a mercaptan with dibenzylamine. Thus, for example, ortho-amido-thiophenol was reacted with dibenzylamine in ether solution to form a product which on evaporation of the ether, and cooling the residual oil in an ice bath, solidifies to a yellowish white solid. Samples of this material have been incorporated in a rubber mix similar to that set forth in the first example heretofore given for the manufacture of a vulcanized rubber product.

Furthermore, it is to be understood that while I have specifically mentioned mercapto-benzothiazole as an example of a mercaptan, other compounds may be used successfully for the preparation of my preferred type of accelerators. Thus, I may use, as a mercaptan compound, aromatic mercaptans, such as thiophenol, thiocresol and the like; benzo-thiazole mercaptans and substitution products thereof, such as mercapto-tolyl-thiazole; mercaptoxazole; the naphthyl-thiazole-mercaptans; thio-oxy-indole

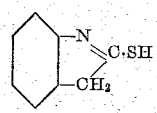

and substitution products thereof; amido-thiophenols and derivatives; 2-mercapto-thiazolin

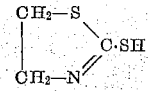

and derivatives; the thio-anilides

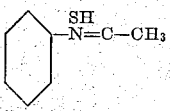

2-mercapto-benzimide-azol; mercapto-iminazole

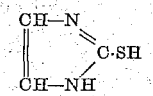

the thio-amides, and compounds such as thio-ammelin

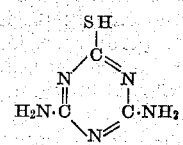

that is mercapto compounds preferably of aromatic series.

The invention is to be understood as not limited to the exact procedure followed or proportions employed in the foregoing examples, which are illustrative only and not limitative of my invention. Moreover, the invention is to be considered as not limited by any theories advanced in explanation of the chemical changes involved in the manufacture of the compounds set forth but is limited solely by the claims attached hereto as a part of this specification wherein I intend to claim all novelty inherent in my invention as is permissible in view of the prior art.

The present application is a continuation in part and a division in part of application Serial No. 61,587 filed by me October 9, 1925.

What I claim is:

1. The process of vulcanizing rubber which comprises heating a mixture of rubber and sulfur in the presence of a vulcanization accelerator comprising a reaction product of a mercapto-benzo-thiazole and piperidine.

2. The process of vulcanizing rubber which comprises heating a mixture of rubber and sulfur in the presence of a vulcanization accelerator comprising the reaction product of substantially equal molecular proportions of mercapto-benzo-thiazole and piperidine.

3. The vulcanized rubber product produced by heating a mixture of rubber and sulfur in the presence of a vulcanization accelerator comprising a reaction product of a mercapto-benzo-thiazole and piperidine.

4. The vulcanized rubber product produced by heating a mixture of rubber and sulfur in the presence of a vulcanization accelerator comprising the reaction product of substantially equal molecular proportions of mercapto-benzo-thiazole and piperidine.

5. The process of vulcanizing rubber which comprises heating rubber and sulfur in the presence of a vulcanization accelerator comprising a reaction product of mercapto-benzo-thiazole and a polymethylene heterocyclic secondary amine.

6. The vulcanized rubber product produced by heating rubber and sulfur in the presence of a vulcanization accelerator comprising a reaction product of mercapto-benzo-thiazole and a polymethylene heterocyclic secondary amine.

7. The process of vulcanizing rubber which comprises heating rubber and sulfur in the presence of a vulcanization accelerator comprising a reaction product of mercapto-benzo-thiazole and one member of a group of compounds consisting of piperidine and piperazine.

8. The vulcanized rubber product obtained by heating rubber and sulfur in the presence of a vulcanization accelerator comprising a reaction product of mercapto-benzo-thiazole and one member of a group of compounds consisting of piperidine and piperazine.

9. The process of vulcanizing rubber which comprises heating rubber and sulfur in the presence of a vulcanization accelerator comprising a reaction product of a mercapto-benzo-azole possessing the structure

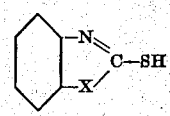

where X represents oxygen or sulfur, and a polymethylene heterocyclic secondary amine.

10. The vulcanized rubber product produced by heating rubber and sulfur in the presence of a vulcanization accelerator comprising a reaction product of a mercapto-benzo-azole possessing the structure

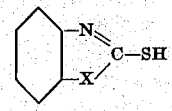

where X represents oxygen or sulphur, and a polymethylene heterocyclic secondary amine.

WINFIELD SCOTT.